United States Patent [19]

Yamaguchi et al.

[11] Patent Number: 4,616,278

[45] Date of Patent: Oct. 7, 1986

[54] INFORMATION RECORD DISK HAVING A UNIFIED STRUCTURE

[75] Inventors: Koushi Yamaguchi, Tagajyo; Kazuo Igari, Miyagi, both of Japan

[73] Assignee: Sony Corporation, Tokyo, Japan

[21] Appl. No.: 534,066

[22] Filed: Sep. 20, 1983

[30] Foreign Application Priority Data

Sep. 21, 1982 [JP] Japan .................. 57-142959[U]

[51] Int. Cl.[4] .................. G11B 5/012; G11B 5/016; G11B 3/70; B65D 85/30
[52] U.S. Cl. .................. 360/99; 360/133; 360/97; 206/444; 346/137; 369/282
[58] Field of Search .................. 360/97, 99, 133, 86; 206/444; 369/282, 290; 346/137

[56] References Cited

U.S. PATENT DOCUMENTS

| | | | |
|---|---|---|---|
| 4,078,246 | 3/1978 | Berthoux et al. | 360/99 |
| 4,152,740 | 5/1979 | Stratton | 360/99 |
| 4,175,274 | 11/1979 | Mann | 360/133 |
| 4,194,228 | 3/1980 | Duff | 360/133 |
| 4,224,648 | 9/1980 | Roling | 360/97 |
| 4,320,425 | 3/1982 | Hall | 360/97 |
| 4,490,764 | 12/1984 | Butz | 206/444 |

FOREIGN PATENT DOCUMENTS 2102188 1/1983 United Kingdom ............... 360/133

OTHER PUBLICATIONS

*IBM Technical Disclosure Bulletin*, vol. 19, No. 12, May 1977, pp. 4722-4723, "Hub Assembly for Flexible Disk Media", by Beck et al.
IBM Technical Disclosure Bulletin, vol. 19, No. 7, Dec. 1976.

*Primary Examiner*—John H. Wolff
*Assistant Examiner*—Alfonso Garcia
*Attorney, Agent, or Firm*—Lewis H. Eslinger; Alvin Sinderbrand

[57] ABSTRACT

An information record disc for use in a magnetic recording and reproducing apparatus to provide a plurality of still pictures in a plurality of spiral tracks on a magnetic disc thereof, includes an annular magnetic plate having an aperture therein; and a cylindrical central core made of plastic and formed with the magnetic plate by an outsert molding process in which the central core includes an upper section extending above the magnetic plate, a lower section extending below the magnetic plate and a connecting section connecting the upper and lower sections through the aperture, the upper and lower sections being offset from the aperture, so that an integral structure is provided with the central core and the magnetic plate, and with the magnetic plate thereby having an outwardly extending radial flange which extends radially outward from the central core and to which the magnetic disc is secured and an inwardly extending radial section which extends inwardly of the central core and which is attracted by a magnet of the magnetic recording and reproducing apparatus to position the information record disc therein.

7 Claims, 3 Drawing Figures

INFORMATION RECORD DISK HAVING A UNIFIED STRUCTURE

BACKGROUND OF THE INVENTION

1. Field of the Invention

This invention relates generally to information record discs and, more particularly, is directed to an information record disc for use in recording video information signals, for example, for still-picture reproduction.

2. Description of the Prior Art

An information record disc has previously been used for recording video information signals in a video camera in a plurality, for example, twenty-five, spiral tracks thereon, with one field of video signals being recorded in each track and one field of a still-picture being reproduced by scanning each track. In this regard, during recording and reproducing from the record disc, a magnetic head contacts the disc when the latter is positioned and rotates within a magnetic recording apparatus.

In accordance with the aforementioned prior art information record disc, a central core made of plastic or other similarly deformable material includes a central bore and an outer flange to which a magnetic disc is adhered. An annular yoke having a central bore and made of a magnetic material, for example, permalloy or the like, is secured to the central core at the underside thereof. During operation, the yoke is attracted by a magnet of the magnetic recording apparatus so as to position the record disc at a predetermined position therein. At such time, a projection or spindle from the magnetic recording apparatus projects through the central bores of the yoke and core and a lower circular skirt of the core also contributes to positioning the record disc in the magnetic recording apparatus.

However, with such prior art arrangement, because the central core is made of plastic which has a high thermal expansion coefficient, the configuration of the central core changes in accordance with temperature changes. In such case, the configuration of the outer flange thereof which has a relatively small thickness undergoes relatively large transformations, resulting in buckling of the magnetic disc which is adhered to the surface of the outer flange. This, of course, results in unstable contact of the magnetic recording head with the magnetic disc, resulting in deterioration of the recording operation. Further, since the yoke is adhered to the underside of the core by an adhesive, the time required to assemble the central core and yoke together may be relatively long, and the strength of contact between the central core and yoke varies with the type of adhesive utilized.

OBJECTS AND SUMMARY OF THE INVENTION

Accordingly, it is an object of this invention to provide an information record disc that avoids the above-described difficulties encountered with the prior art.

More particularly, it is an object of this invention to provide an information record disc in which buckling of the magnetic disc caused by deformation of the plastic core as a result of temperature changes is prevented.

It is another object of this invention to provide an information record disc in which the magnetic disc is adhered to the metal yoke, rather than the plastic core.

It is still another object of this invention to provide an information record disc in which the central core is integrally molded around the yoke to provide a unitary assembly.

In accordance with an aspect of this invention, an information record disc includes central core means; annular magnetic plate means unified with said central core means and having flange means extending radially outward from said central core means, said flange means formed with a relatively flat surface; and magnetic disc means secured to said relatively flat surface of said flange means.

The above, and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
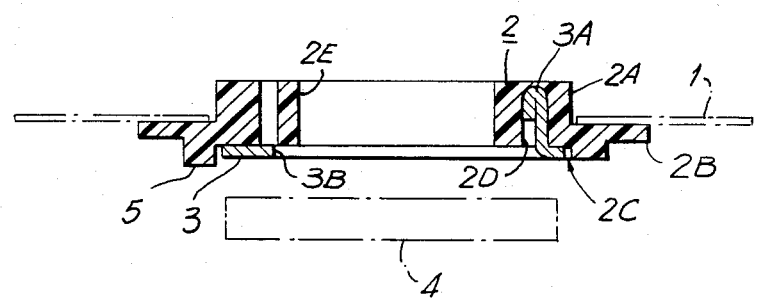
FIG. 1 is a schematic cross-sectional view of an information record disc according to the prior art.

Referring to the drawings in detail, and initially to FIG. 1 thereof, an information record disc according to the prior art includes a central core 2 made of plastic or other similarly deformable material, and which has a cylindrical section 2A with a flange 2B extending radially outward therefrom. Central core 2 also includes a downwardly extending circular skirt 5 adjacent cylindrical section 2A and which defines a circular recessed section 2C at the underside of central core 2. A bore 2E is also provided centrally of core 2 and is surrounded, at least partially, by an additional bore 2D which extends between cylindrical section 2A and central bore 2E.

A thin magnetic disc 1 is adhered to the upper surface of flange 2B by a suitable adhesive or cement. In addition, an annular yoke 3 of a magnetic material, for example, permalloy, is attached to the underside of central core 2 in recessed section 2C thereof and has a central bore 3B which may be substantially coaxial with central bore 2E. Yoke 3 also includes an upwardly projecting portion 3E which is inserted into bore 2D and adhered therein by a suitable adhesive or cement so as to secure yoke 3 with core 2.

In operation, yoke 3 is attracted by a magnet 4 in a magnetic recording apparatus, for example, of the type described in copending U.S. patent application Ser. No. 06/537,989, filed Oct. 3, 1983, having a common assignee herewith and the disclosure of which is incorporated herein by reference, whereby to fix said information record disc of FIG. 1 therein at a predetermined position. In addition, a spindle of the magnetic recording apparatus fits within central bore 2E and, with skirt 5 of central core 2, contribute to accurately position the record disc in the magnetic recording apparatus, so as to provide for stable rotation of central core 2 and magnetic disc 1 adhered thereto. Accordingly, after the information record disc of FIG. 1 is mounted within the magnetic recording apparatus, as aforementioned, central core 2 and magnetic disc 1 are caused to rotate and a magnetic head contacts magnetic disc 1 at such time to record information signals in spiral tracks on magnetic disc 1 or to reproduce the information signals therefrom.

However, with the information record disc according to the prior art of FIG. 1, because central core 2 is made of plastic or similarly deformable material having a high thermal expansion coefficient, the configuration of central core 2 will change in response to large temperature changes. This change in configuration is particularly evident at flange 2B which has a relatively small thickness. As a result, magnetic disc 1 which is adhered to the upper surface of flange 2B is caused to buckle. Further, with the information record disc according to the prior art of FIG. 1, yoke 3 is adhered to central core 2 by a suitable adhesive or cement, the strength of adhesion varying depending on the type of adhesive used. It is to be further appreciated that the time required to adhere yoke 3 with central core 2 may be relatively long, resulting in undesirable delays in manufacturing the information record disc according to the prior art of FIG. 1.

Figure 2:
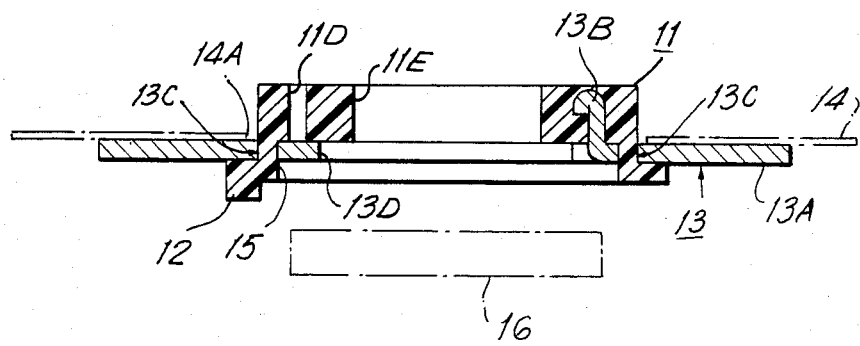
FIG. 2 is a schematic cross-sectional view of an information record disc according to one embodiment of the present invention.
Figure 3:
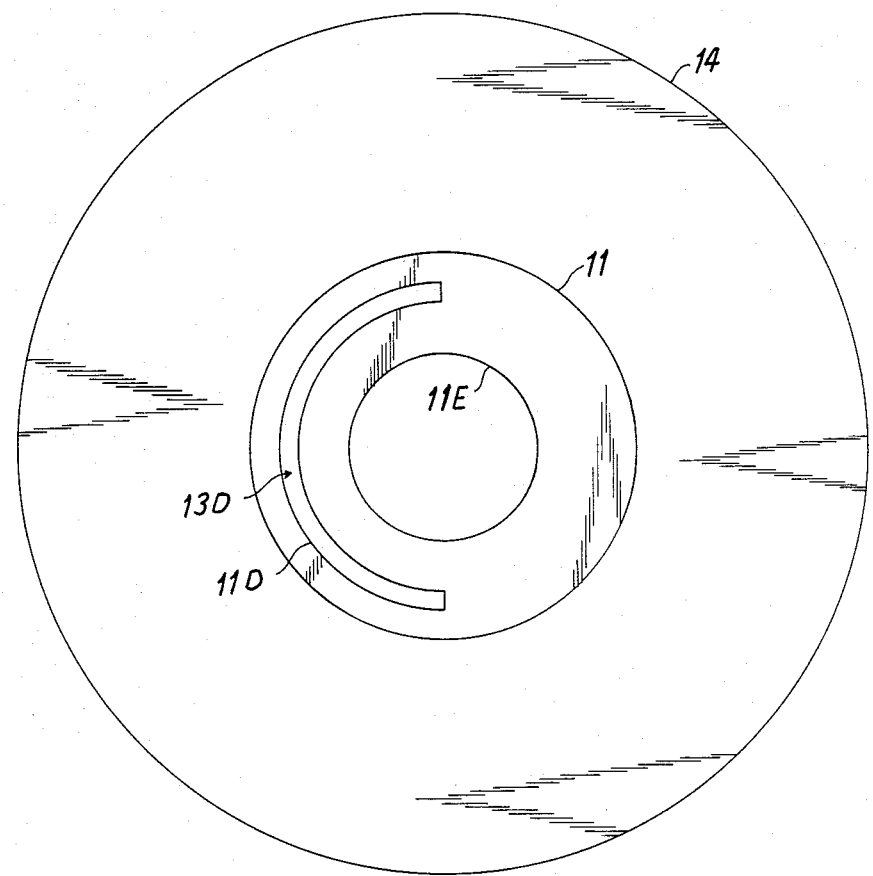
FIG. 3 is a top plan view of the information record disc of FIG. 2.

Referring now to FIG. 2, an information record disc according to one embodiment of the present invention will be described in which elements corresponding to those previously described in respect to the prior art information record disc of FIG. 1 are identified by the same reference numerals, and a detailed description thereof will be omitted herein for the sake of brevity. The information record disc of FIG. 2 according to the present invention includes a cylindrical central core 11 made of plastic or other similarly deformable material and having a downwardly extending circular skirt 12, similar to skirt 5 of the prior art disc of FIG. 1 and which may be mounted about a rotating axis portion of the magnetic recording apparatus to accurately position the information record disc therein. As with the prior art information record disc of FIG. 1, the information record disc according to the present invention, as shown in FIG. 2, includes a central bore 11E and an intermediate bore 11D (FIG. 3) which at least partially surrounds central bore 11E.

In accordance with the present invention, an annular magnetic plate 13 which is made, for example, of permalloy, and which has a central bore 13D, is fixed with central core 11 by molding central core 11 on annular magnetic plate 13 by, for example, an outsert molding process, so as to provide a unified structure for the information record disc. More particularly, a mold is mounted on annular magnetic plate 13, and plastic is poured into the mold through an aperture 13C formed in yoke 13. Accordingly, central core 11 includes an upper section extending above yoke 13 at a position offset from aperture 13C, a lower section extending below yoke 13 to form skirt 12 which is also offset from aperture 13C, and a connecting section which connects the upper section to the lower section through aperture 13C, so as to unify yoke 13 and central core 11 into an integral structure. In this regard, unlike the information record disc according to the prior art of FIG. 1, it is unnecessary to secure the yoke to the central core by an adhesive. Further, because of such procedure, the tolerances are increased and the assembly procedure is simplified. In addition, as with yoke 3 according to the prior art of FIG. 1, yoke 13 according to the present invention includes an upstanding projecting portion 13B which is firmly fixed within intermediate bore 11D to further add to the unification of yoke 13 with central core 11. It is to be appreciated that, with the information record disc according to the present invention, a circular recessed section 15 is formed in central core 11 at the underside of yoke 13 and is substantially coaxial with central bore 11E. As a result, annular magnetic plate 13D is exposed at the interior of central core 2 and is attracted by a magnet 16 of the magnetic recording apparatus to position the information record disc therein.

In addition, it is to be appreciated that yoke 13 radially extends outwardly from central core 11 and thereby forms a flange 13A which is similar to flange 2B according to the prior art of FIG. 1. However, since yoke 13 is made of a metal which has a small temperature expansion coefficient, yoke 13 and, more particularly, flange 13A thereof, does not deform as readily as plastic flange 2B according to the prior art. In this manner, a magnetic disc 14 having a central bore 14A which fits over central core 11 is secured to the upper surface of flange 13A of yoke 13 by a suitable adhesive, and thereby does not buckle to any great extent, if at all, due to temperature variations. Accordingly, an information record disc which provides a strong unification between the central core and annular magnetic plate is provided and in which an outer flange thereof at which the magnetic disc is adhered is not easily deformed by temperature variations.

It is to be appreciated that various modifications can be readily made by one of ordinary skill in the art in accordance with the claims herein. For example aperture (or apertures) 13C may be spaced radially outwardly from the position shown in FIG. 2. In such case, central core 11 can be formed within bore 13B of plate 13, so as to include an upper section and a lower section which wrap around bore 13D to secure core 11 thereto, with skirt 12 being separately formed radially outward therefrom through aperture (or apertures) 13C. The magnetic disc 14 would still be secured to the upper surface of flange 13A of plate 13.

Having described a specific preferred embodiment of the invention with reference to the accompanying drawings, it is to be understood that the present invention is not limited to this specific embodiment and that various changes and modifications may be effected therein by one skilled in the art without departing from the scope and spirit of the invention as defined by the appended claims.

What is claimed is:

1. An information record disc comprising:
   a substantially cylindrical central core means formed of a deformable plastic material and adapted to receive a spindle of an information recording apparatus;
   annular magnetic plate means which is relatively dimensionally stable over the normal temperature range for operation of the record disc and which has a radially inner portion formed in interlocking configuration with said central core means to constitute an integral structure therewith;
   said annular magnetic plate means having flange means extending radially outward from said central core means, said flange means being formed with a relatively flat surface; and
   magnetic disc means secured directly to said relatively flat surface of said flange means of the relatively dimensionally stable magnetic plate means so as to avoid temperature induced distortions of said disc means.

2. An information record disc according to claim 1; in which said central core means includes an underside formed with a recessed section which partially exposes said radially inner portion of said annular magnetic plate means to attraction by magnet means of said information recording apparatus.

3. An information record disc according to claim 2; in which said annular magnetic plate means includes at least one aperture therein and said central core means includes an upper section extending above said annular magnetic plate means, a lower section extending below said annular magnetic plate means and a connecting section which connects said upper section and lower section through said at least one aperture in said magnetic plate means.

4. Apparatus according to claim 3; in which said upper section and said lower section of said central core means are offset from said at least one aperture of said magnetic plate means.

5. An information record disc according to claim 4; in which said central core means is formed by an outsert molding process with said annular magnetic plate means.

6. An information record disc according to claim 1; in which said central core means is formed by an outsert molding process with said annular magnetic plate means.

7. An information record disc according to claim 1; in which said central core means includes a central bore and an intermediate bore, and said magnetic plate means includes projection means positioned within said intermediate bore.

* * * * *